United States Patent [19]

Thorn

[11] Patent Number: 4,957,279
[45] Date of Patent: Sep. 18, 1990

[54] FLUIDLESS MULTI-DIRECTIONAL MOTION-DAMPING MOUNT

[75] Inventor: Richard P. Thorn, Erie, Pa.

[73] Assignee: Lord Corporation, Erie, Pa.

[21] Appl. No.: 381,617

[22] Filed: Jul. 18, 1989

[51] Int. Cl.⁵ .............................................. F16F 3/08
[52] U.S. Cl. ............................... 267/140.5; 248/562; 267/140.1; 267/141.3
[58] Field of Search ............... 248/562; 267/140.1, 267/140.3, 140.5, 141.1, 141.2, 141.3, 153, 219

[56] References Cited

U.S. PATENT DOCUMENTS

| | | | |
|---|---|---|---|
| 2,668,033 | 2/1954 | Lee | 267/140.3 |
| 3,232,597 | 2/1966 | Gaydecki | 267/219 |
| 3,399,851 | 9/1968 | Racca | 267/140.3 |
| 4,842,258 | 6/1989 | Misaka et al. | 267/140.1 |

Primary Examiner—Duane A. Reger
Attorney, Agent, or Firm—Howson and Howson

[57] ABSTRACT

Fluidless mounts capable of damping motion in several directions are disclosed. The mounts utilize hysterisis losses in an elastomeric material to absorb energy. The losses are induced by rigid rib and grooved elements which are displaced along the surface of an elastomeric layer in pressure engagement therewith. Amplitude-sensitive damping embodiments are disclosed.

19 Claims, 3 Drawing Sheets

FLUIDLESS MULTI-DIRECTIONAL MOTION-DAMPING MOUNT

FIELD OF THE INVENTION

The present invention relates to vibration isolators, and more particularly, the present invention relates to non-fluid mounts capable of damping motion in at least two directions.

BACKGROUND OF THE INVENTION

Over the past several years, so-called fluid mounts have found application in a variety of uses where motion damping is required. For instance, in some modern vehicles, engines are mounted to frames utilizing fluid mounts which can be designed to provide desired amplitude and/or frequency responsive vibration isolation. An example of such a mount is disclosed in U.S. Pat. No. 4,709,907 owned by the assignee of the present invention.

While fluid mounts may function satisfactorily for their intended purposes, fluid mounts, in general, have certain drawbacks. For instance, they are somewhat difficult to manufacture on a mass-production basis because of the need both to fill the mount and to insure against leakage in use. Hence, fluid mounts are not as inexpensive as desired for applications in which cost and reliability are important considerations.

An isolator that does not require fluid to damp vibrations has been proposed. Such an isolator is disclosed in U.S. Pat. No. 3,232,597 to Gaydecki. In the Gaydecki isolator, uniaxial vibration damping is provided by means of a rigid rib and groove member which is slidably moved in pressure engagement along an elastomeric element. The Gaydecki isolator utilizes the hysteresis of the elastomer to effect damping.

While the Gaydecki isolator may function satisfactorily to damp motion along a single axis, there are many applications, such as the aforedescribed automotive engine to frame mounting application, which require damping along a plurality of axes, such as the X, Y and Z axes. Moreover, there is a need for such a fluidless mount which can be manufactured readily utilizing conventional mass-production manufacturing techniques and equipment. There is also a need for a mount which of this type which can provide amplitude-sensitive damping.

OBJECTS OF THE INVENTION

With the foregoing in mind, a primary object of the present invention is to provide a novel fluidless mount which can damp vibrations in more than one direction.

Another object of the present invention is to provide an improved non-fluid vibration isolator which can damp vibrations imparted either independently or simultaneously along the X, Y and Z axes.

A further object of the present invention is to provide a unique fluidless mount which can provide different levels of damping in different directions in response to different amplitudes of input motion.

Yet another object of the present invention is to provide a rugged, reliable, readily manufacturable fluidless mount which can damp vibrations imparted on one or more of three orthogonal intersecting axes.

SUMMARY OF THE INVENTION

More specifically, the present invention provides a mount for damping motion in at least two directions. The mount comprises a first member, such as a tube, which is adapted to be connected to a first object; a second member, such as a shell, surrounding the first member and adapted to be connected to a second object; and a resilient element interposed between the members and mounting the first member for translation in a first direction alongside and relative to the second member and for motion in a second direction lateral to the first direction. A first resiliently deformable layer extends along the first direction, and at least one second resiliently deformable layer extends along the second direction. The first layer is preferably provided by the resilient element which has an interior surface forming a cavity in the resilient element. The second resiliently deformable layer is preferably provided on a flange mounted on the first member for movement therewith in the second direction in the cavity. A rigid rib means is provided for engaging both the first and second resilient layers and slidably deforming the layers in response to motion of the first member relative to the second member in either, or both directions. In one embodiment, a lost motion connection is provided between the rigid rib means and either or both of the members to accommodate small amplitude displacements with little or no damping. Another embodiment provides certain additional advantages including accommodating greater cocking motions.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENTS

Figure 1:
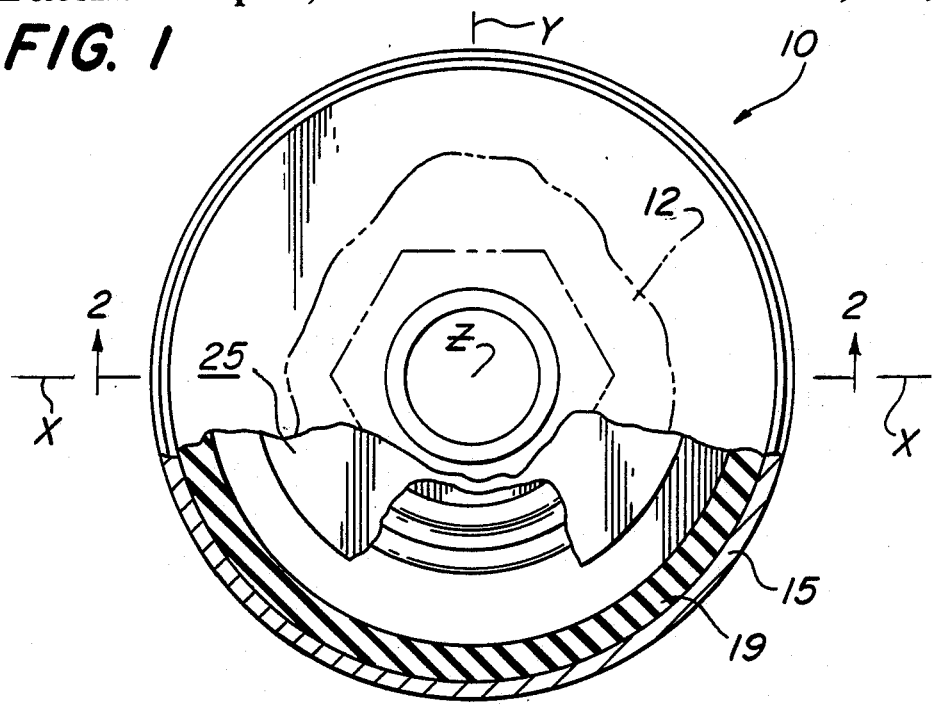
FIG. 1 is an end elevational view of one embodiment of a mount constructed in accordance with the present invention, portions being broken away to expose interior details of construction.

Referring now to the drawings, FIG. 1 illustrates one preferred embodiment of a mount 10 which embodies the present invention. The mount 10 is of the so-called tube form variety which comprises a first member, such as a bushing 11 which is adapted to be connected to a first object, such as the spaced parallel mounting plates 12 and 13, by means of a bolt 14, shown in phantom. A second member, such as a cylindrical tube, or shell, 15 surrounds the first member 11 and is coaxial therewith about a central longitudinal axis Z. The second member 15 is adapted to be connected to a second object, as by being inserted in a bore of a base, or connecting rod (not shown).

The first and second members 11 and 15 are mounted for movement relative to one another on the Z axis, and laterally, or transversely of the Z axis on the X and Y axes by means of a resilient block 16 interposed between the first and second members 11 and 15. Preferably, the resilient block 16 is of an elastomeric material, such as rubber and is bonded to the members 11 and 15. Thus, the elastomeric block 16 permits the inner, or first member 11 to move vertically on the Z axis, horizontally on the X axis, and horizontally on the Y axis (perpendicular to the plane of the drawing).

Figure 2:
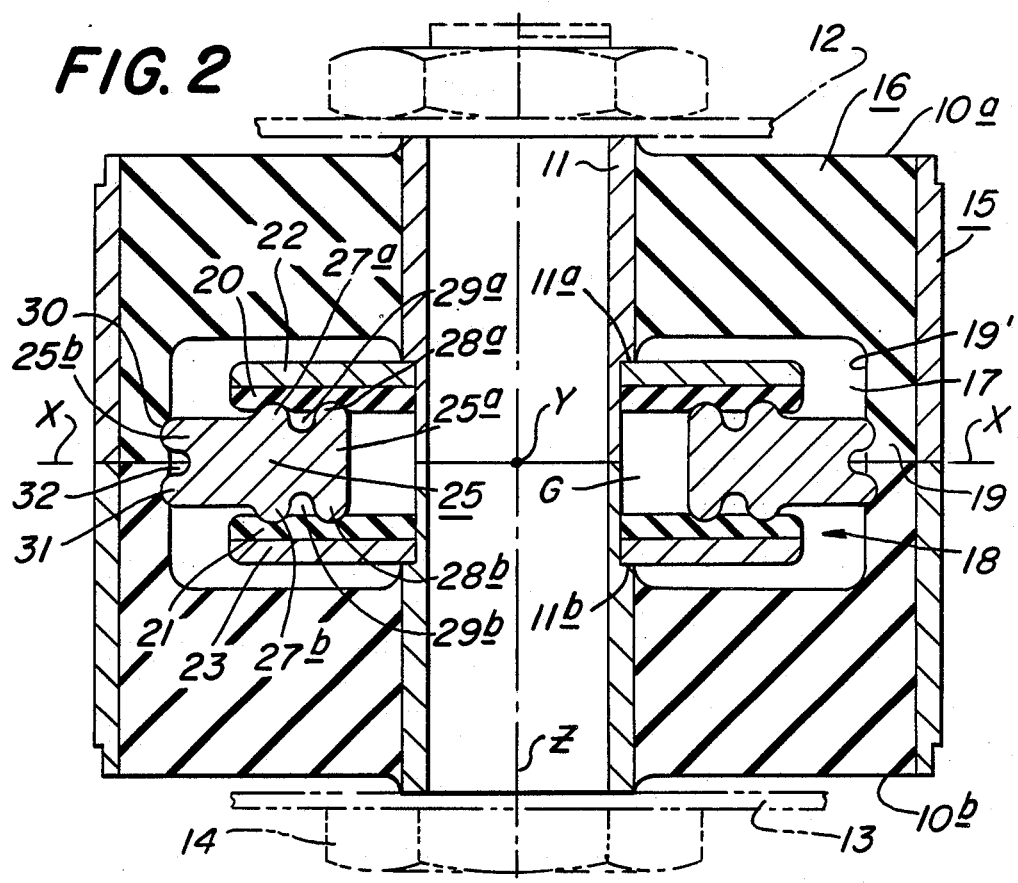
FIG. 2 is an enlarged longitudinal cross-sectional view taken on line 2—2 of FIG. 1.

As best seen in FIG. 2, the elastomeric block 16 has an internal annular cavity, or chamber 17 which contains a damping assembly indicated generally at 18. In the embodiment illustrated in FIGS. 1-3, the damping assembly 18 includes a first resiliently deformable layer 19 which extends along the inner periphery of the shell 15 along the Z axis. Preferably, the first layer 19 has a constant relatively uniform thickness in the direction of the Z axis and has a predetermined axial extent in that direction. The first layer 19 has a certain minimum thickness in the radial direction, i.e. transverse, or lateral to the path of movement of the bushing 11 on its longitudinal, or Z axis. Preferably, as illustrated in FIG. 2, the first resiliently deformable layer 19 is molded integral with the resilient block 16, and the cylindrical inner peripheral surface 19' of the first deformable layer 19 is smooth.

In addition to the first resiliently deformable layer 19, the damping assembly 18 also includes at least one, and preferably a pair, of second resiliently deformable layers 20 and 21 contained in the cavity 17. In the embodiment illustrated, the layers 20 and 21 are bonded to circular washer-like flanges 22 and 23, respectively. The washer-like flanges are mounted in the cavity 17 with their deformable surfaces 20 and 21 in axially spaced confronting relation with a gap G disposed therebetween. The flanges 22 and 23 are located on the bushing 11 between shoulders 11a and 11b provided at axially spaced locations and move in unison with the bushing 11. Preferably, the layers 20 and 21 extend continuously about the bushing 11, and are of a substantially constant and uniform thickness for a predetermined extent in the Z direction.

For the purpose of slidably resiliently deforming both the first layer 19 and the second layers 20 and 21 in response to motion of the bushing 11 along its central Z axis and laterally on either or both of the X and Y axes, a ring-like, or annular, slide element 25 is mounted in the gap G. The ring-like slide element 25 surrounds the bushing 11 and has an inner circumferential portion 25a engaged between the opposed resilient layers 20 and 21 and has an outer peripheral portion 25b which engages the peripheral resilient layer 19. In the embodiment illustrated in FIG. 2, the circumferential portion 25a has opposite sides, each of which, such as the upper side, has a pair of parallel continuous ridges 27a and 28a separated by a groove 29a. Like ridges and grooves 27b, 28b and 29b, respectively are provided on the opposite, or lower side of the slide ring 25. A similar pair of ridges 30 and 31 are provided on the outer peripheral portion 25b of the slide ring 25, and they are separated by a groove 32.

The ridges and grooves on the slide ring element 25 are configured relative to the elastomeric layers 19, 20 and 21 to cause the elastomeric layers to deform adjacent their zones of engagement with the ridges. As a result, any movement of the slide ring element 25 under pressure relative to its engaged elastomeric layer causes the elastomeric layer in the zone adjacent the point of contact to move in a wave-like manner, either ahead of or behind the ridge. Such wave-like movement of the elastomeric layer develops hysteresis within the elastomeric layer, and such hysteresis acts in a well-known manner to absorb energy and thereby to damp relative movement. Thus, for example, when the inner bushing 11 is displaced downwardly relative to the sleeve 15, such as from the neutral or home position illustrated in FIG. 2 into the downwardly and laterally displaced position illustrated in FIG. 3, the slide-ring 25 moves downward a corresponding amount, and its ridges 30 and 31 slide along the peripheral elastomeric wall 19 to damp motion of the bushing 11 relative to the sleeve 15 in the direction of the Z axis. In like manner, motion of the bushing 11 laterally along the X axis relative to the sleeve 15 causes the flanges 22 and 23, and their respective elastomeric layers 20 and 21 to move laterally relative to the inner portion 25a of the slide-ring 25, thereby damping motion along that axis. Motion along the other horizontal, or Y, axis is damped in a similar manner. In addition, in this embodiment certain limited cocking motions of the bushing 11 relative to the sleeve 15 can also be damped.

In order to enable the mount 10 to be assembled, and to enable manufacturing economies to be realized by minimizing the use of different parts, the mount 10 is fabricated in two identical sections 10a and 10b which are divided horizontally in the plane of the X and Y axes. Prior to assembly of the sections 10a and 10b into the configuration illustrated in FIGS. 1 and 2, the washer-like flanges 22 and 23 are each first slid axially on their respective reduced-diameter portions of the bushing 11 into engagement with their respective shoulders 11a and 11b. Afterward, the slide-ring 25 is placed in the gap G, and the sections 10a and 10b are forced axially toward one another into the assembled position illustrated in FIG. 2. Preferably, adjacent surfaces, particularly the elastomeric surfaces of the resilient block 19, may be provided with an appropriate adhesive to bond the elastomeric portions together along the horizontal line of juncture of the mount sections 10a and 10b. In many applications the connecting bolt 14 will provide clamping pressure in the Z axial direction; however, in applications where a connecting bolt 14 is not utilized, the sections 10a and 10b may be connected together as by spot welding at peripheral locations externally of the sleeve 15 and internally of the bushing 11, although this mode of providing clamping pressure may increase manufacturing costs somewhat.

Usually axial and radial damping values are different and can be made equal by proper design of the damping ring an rubber configuration.

Figure 3:
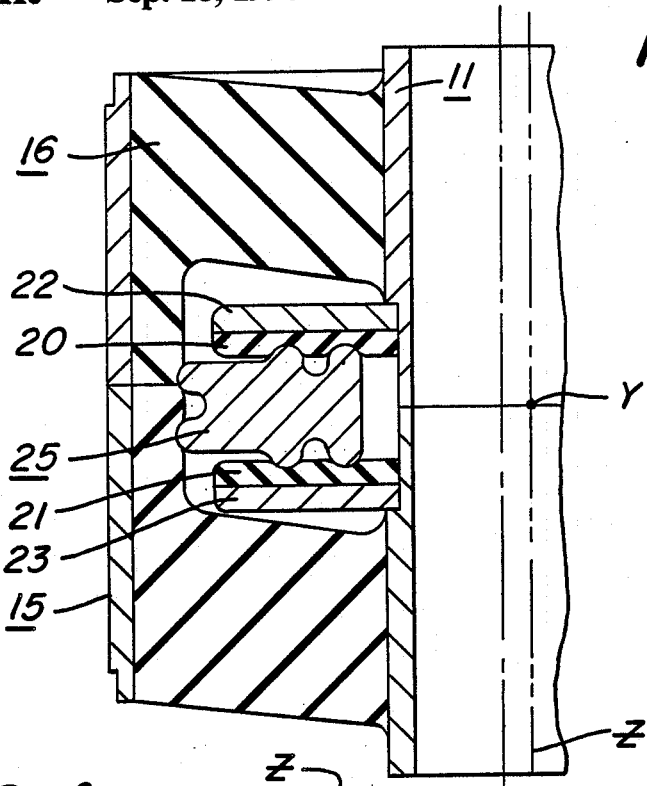
FIG. 3 is a longitudinal fragmentary view, similar to FIG. 2, but illustrating a portion of the mount in a downwardly and laterally displaced position.

In the embodiment of FIGS. 1-3, any movement of the bushing 11 relative to the sleeve 15 causes some relative movement to occur between the slide-ring 25 and either the elastomeric layer 19 or the elastomeric layers 20 and 21. Thus, in this embodiment, virtually all relative motion is subject to damping. There may be, however, applications where such damping is undesirable, and it may be desired either to provide for a limited range of relative movement to occur before damping is induced or to provide different degrees of damping in different directions. To this end, the embodiment of FIG. 4 is provided.

Figure 4:
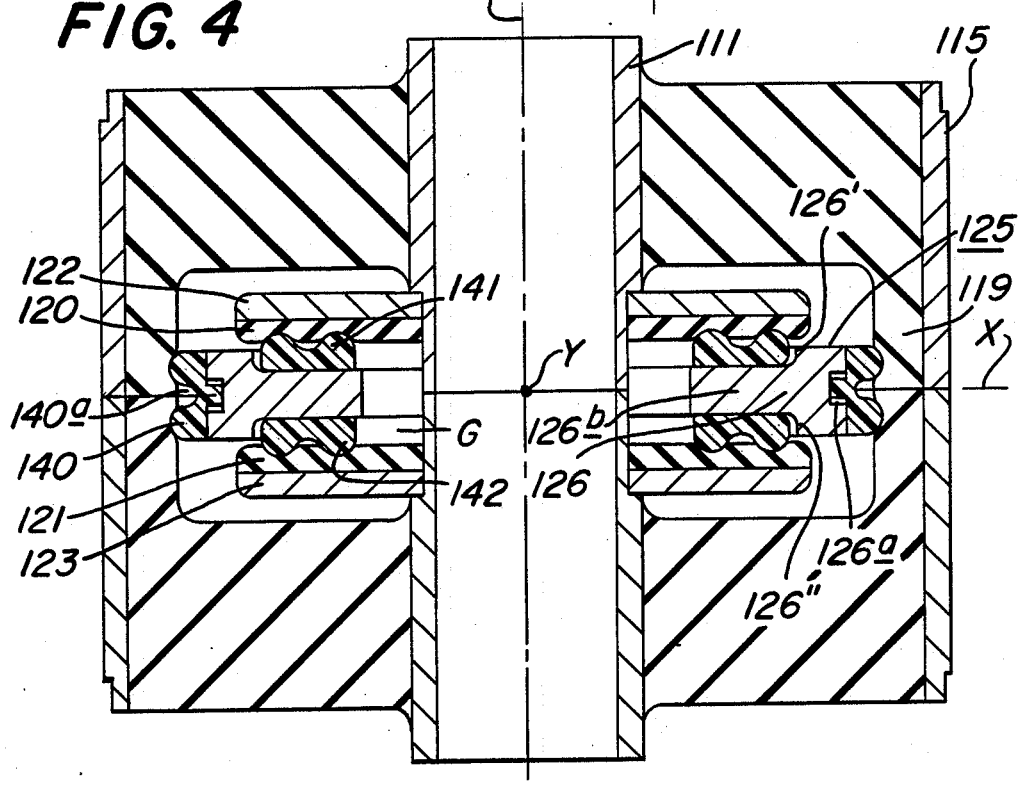
FIG. 4 is a longitudinal sectional view, similar to FIG. 2, but of a modified embodiment of the present invention which is amplitude-sensitive.
Figure 5:
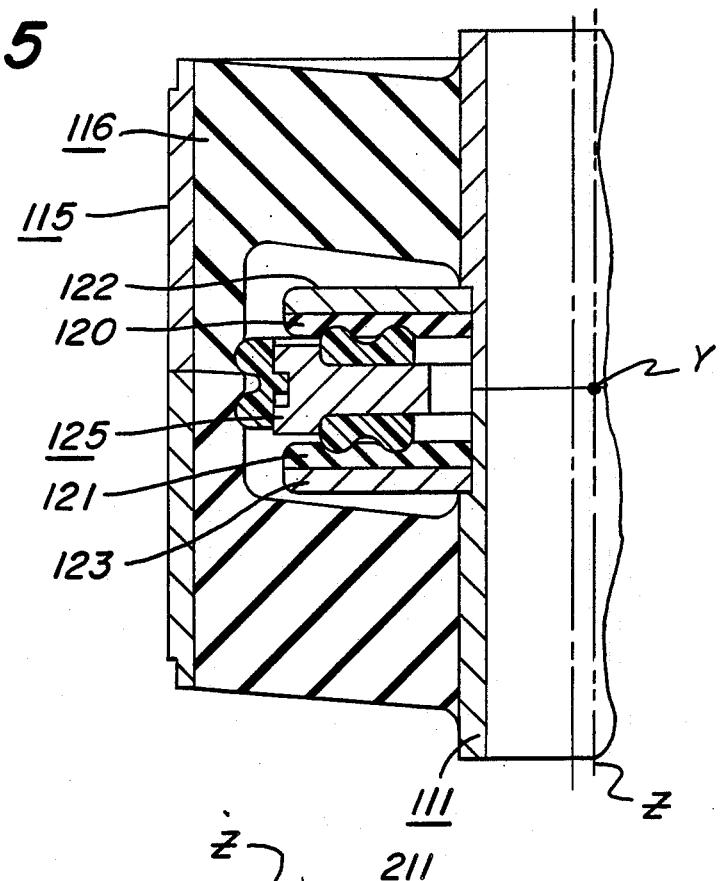
FIG. 5 is a longitudinal fragmentary cross-sectional view, similar to FIG. 3, but illustrating a portion of the mount in a downwardly and laterally displaced position.

The embodiment of FIG. 4 is similar in most respects to the embodiment of FIGS. 1-3, except for a novel slide-ring assembly 125. In the embodiment of FIGS. 1-3, the slide-ring 25 is of one-piece construction. In the embodiment of FIG. 4, however, the slide-ring assembly 125 is of multi-piece construction which provides a lost motion connection between the sleeve 111 and bushing 115 in at least one direction, and preferably in directions along all three orthogonal intersecting X, Y and Z axes.

To provide a lost motion connection in the Z direction, the slide-ring assembly 125 includes a rigid annular carrier ring element 126 which has an outer peripheral groove 126a that slidably receives a radially-inwardly extending flange portion 140a of a rib providing means 140. The rib providing means 140 has a profile which is like in configuration to the ridges and grooves provided in the embodiment of FIGS. 1-3 and cooperates in a similar fashion to deform the elastomeric layer 119 in response to relative movement between the bushing 111 and sleeve 115 along the Z axis. In this embodiment, however, the peripheral groove 126a is dimensioned larger relative to the width of the flange 140a to provide a clearance in the Z direction. The magnitude of the clearance is preselected to enable the bushing 111, and hence the carrier ring 126, to move a predetermined limited amount before the slide-element 140 is engaged and displaced along the elastomeric layer 119. Thus, it should be apparent that limited degrees of oscillation of the bushing 111 on the Z axis relative to the sleeve 115 can be accommodated without causing significant damping to occur. The slide-element 140 may be assembled on its carrier ring 126 either by being split, much like a piston ring, or by splitting the carrier ring 126 into upper and lower sections along a horizontal plane which intersects the peripheral groove 126a.

In order to provide a lost motion connection in the X and Y directions, the carrier ring 126 is provided with a circumferential region 126b of reduced thickness in the region of the gap G between the elastomeric layers 120 and 121. Slide-elements 141 and 142 of identical construction are mounted on opposite sides of the carrier ring 126 in the region of the reduced thickness portion 126b. Upper and lower annular shoulders 126' and 126" are provided on the carrier ring 126 outwardly of the reduced thickness portion 126b.

With this construction, motion of the bushing 111 on either the X or Y axis relative to the sleeve 115 causes the resilient layers 120 and 121 to displace the slide-elements 141 and 142 relative to the carrier ring 126 until such time as the slide elements 141 and 142 engage the shoulders 126' and 126", whereupon further motion of the bushing 111 relative to the sleeve 115 causes the elastomeric layers 120 and 121 to move relative to the slide-elements 141 and 142 for causing damping to occur in the manner described heretofore.

Figure 6:
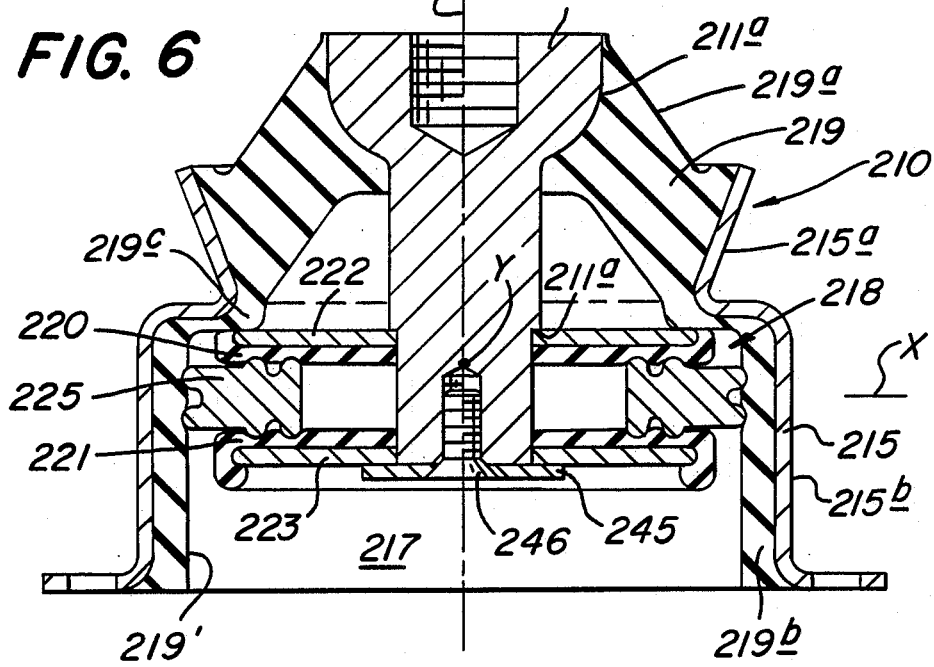
FIG. 6 is a longitudinal cross-sectional view of a third embodiment of a mount constructed in accordance with the present invention and particularly suited for automotive powerplant mounting applications.

The present invention also provides an embodiment which is particularly suited for use in mounting the engine of a vehicle to its frame in a manner providing multi-dimensional damping and accommodating cocking motions. To this end, the mount 210 of FIG. 6 is provided.

The mount 210 includes a stem 211 extending vertically on the Z axis and adapted at its upper end to threadedly receive a mounting bolt (not shown). A drawn metal shell 215 surrounds the lower portion of the stem 211 and is relatively movably connected thereto by a resilient elastomeric block 219 having an upper frustoconical portion 219a extending between and bonded to a bulbous portion 211a of the stem 211 and an outturned peripheral flange 215a of the shell 215. The lower portion 215b of the shell 215 is cylindrical and has an outturned mounting flange, and the inside of the lower portion 215b of the shell 215 has a layer of elastomeric material 219b bonded thereto. The layer 219b has an inner peripheral surface 219' which defines a cavity 217 that receives a damping assembly 218.

The damping assembly 218 is similar in construction to the assembly 18 in the embodiment of FIGS. 1-3, but with certain differences. It should be understood, of course, that the damping assembly which incorporates lost motion connections, such as illustrated in the embodiment of FIG. 4, may also be utilized in the embodiment of FIG. 6 in those applications which warrant amplitude-sensitive damping.

The damping assembly 218 includes a slide-ring 225, like in construction to the slide-ring 25 in FIG. 2, and upper and lower washer-like flange elements 222 and 223 to which are bonded resilient layers 220 and 221, respectively. Preferably, the elastomeric layers 220 and 221 wrap around the outer peripheral edges of the flanges 222 and 223 to provide snubbing in the X and Y directions. The upper portion 219a of the resilient bock 219 has a portion 219c which overlies the outer peripheral portion of the upper flange 222 to provide snubbing in the Z direction. The upper washer-like flange 222 abuts against a shoulder 211a on the stem 211, and the lower washer-like flange 223 is mounted to the stem 211 by means of a washer 245 and a threaded fastener 246 received axially in the bottom of the stem 211. Thus, the slide-ring 225 is clamped firmly between the washer-like flanges 222 and 223 by a form of clamping means which is structurally different from that utilized in the aforementioned embodiments but which is functionally similar. In addition to meeting the particular requirements of an engine mount, this embodiment has the advantage of being straightforward to assemble. It also permits a greater degree of cocking motion to be accommodated and damped because the bulk of the elastomeric block is disposed primarily to one side of the damping assembly 218, rather than being located on both sides as in the aforementioned embodiments.

The present invention enables different levels of damping to be provided in different directions by a proper selection of the coefficients of friction between relatively slidable parts. For instance, the elastomeric layers 20 and 21 bonded to the washers 22 and 23 in the embodiment of FIG. 2 can be different in composition from the elastomeric material forming the wall 19. Alternatively, different pressures may be applied in the Z direction than in the X and Y directions, as by varying the axial spacing between the shoulders 11a and 11b, or the thickness of the layers 19, 20 and 21 relative to a slide-ring 25 of a particular dimensional configuration. Also, the profile of the ridges and grooves in the circumferential portion of the slide-ring 25 may be different from the profile of the ridges and grooves on the peripheral portion.

In the embodiment of FIGS. 1-3 and 6, the elastomeric material utilized to provide all the layers is preferably of a composition which is abrasion resistant, highly damped and resistant to crack propagation. Such an elastomeric material may be a blend of natural and synthethic rubber components, such as an SBR type material. The elastomeric layers are preferably precompressed to a predetermined extent, preferably in a range of about 5% to about 30% of their thickness in the direction of compression in order to provide acceptable damping and service life. The slide element 25 may be fabricated of a metal, such as steel, aluminum or the like, which is coated with a tetrafluoroethylene-filled silicone grease or other antifriction coating, or it may be molded of polymeric material which is internally lubricated and reinforced, such as glass reinforced nylon having up to about 5 to 30%, by weight, of tetrafluoroethylene filler and up to about 2%, by weight, of silicone oil additive. The surface finish is most important for improved life and should be in the 1 to 25 microinch range for best results.

In the embodiment of FIG. 4, it is important for the coefficient of sliding friction between the carrier element 126 and the ribbed and grooved elements 140–142 carried thereon to be different from the coefficient of sliding friction between the same elements and their engaged elastomeric layers in order to ensure that the elastomeric layers 120 and 121 are coupled with the slide elements 141 and 142 for causing them to slide relative to the carrier ring 126 before the limits of motion are reached in the X and Y directions, and to permit limited motion in the Z direction before the limits of motion are reached between the carrier ring 126 and the peripheral slide element 140. For this purpose, the coefficient of sliding friction between the elements 140–142 and their associated elastomeric layers and carrier ring 126 are preferably in a predetermined ratio with respect to one another. For instance, the coefficient of sliding friction between the carrier ring 126 and the slide elements 141 and 142 is lower than the coefficient of sliding friction between the elements 140 and 142 and their engaged elastomeric layers 120 and 121, respectively, by a ratio in a range of about 1:3 to about 1:15. In the embodiment of FIG. 4, the range of lost motion provided by the construction illustrated is typically in a range of about 0.005 inches to about 0.060 inches.

In view of the foregoing, it should be apparent that the present invention now provides an improved mounts which provide damping in a plurality of directions without requiring fluid as a working medium. Their design is such as to enable different levels of damping to be incorporated in different directions without major revisions in overall construction. The mounts of the present invention can, therefore, be designed in a straightforward manner and manufactured readily utilizing known manufacturing techniques. Thus, the mounts overcome many of the drawbacks of known fluid-filled vibration isolators.

As described above, the damping results primarily hysteresis in the elastomer. By proper selection of the materials at the rubbing interface, the hysteresis damping can be supplemented by significant amounts of either friction damping or viscous shear damping. The exact proportions depend upon the application and specific design geometries.

While preferred embodiments of the present invention have been described in detail, various modifications, alterations and changes may be made without departing from the spirit and scope of the present invention as defined in the appended claims.

We claim:

1. A mount for damping motion in at least two directions, comprising:
    a first member adapted to be connected to a first object,
    a second member adapted to be connected to a second object,
    a resilient element interposed between the members and mounting the first member for translation in a first direction alongside and relative to the second member and for motion in a second direction lateral to said first direction,
    means providing a first resiliently deformable layer extending along said first direction,
    means providing a second resiliently deformable layer extending along said second direction, and
    means providing a rigid rib engaging both said first and said second resilient layers for slidably deforming said layers in response to motion of said first member relative to said second member in either or both of said directions,
    whereby relative motion between the members can be damped in one or more directions.

2. A mount according to claim 1 wherein said rigid rib providing means includes means movable with one of said members, and means providing a lost motion connection in at least one of said directions between said movable means and said rigid rib.

3. A mount according to claim 1 wherein the coefficient of sliding friction between said rigid rib providing means and said first resilient layer is different from the coefficient of sliding friction relative to said second resilient layer.

4. A mount according to claim 1 wherein said resilient element includes an elastomeric block having an outer periphery secured to said second member and an inner periphery secured to said first member, said elastomeric block having a cavity for containing said rigid rib providing means and for providing said first resiliently deformable layer alongside said first member.

5. A mount according to claim 4 wherein said means providing said second resiliently deformable layer includes a pair of flanges mounted in spaced relation to said first member and extending in said lateral direction with a gap therebetween, said second resiliently deformable layer being secured to at least one of said flanges and facing said gap, said rigid rib providing means including a ring-like element mounted in said gap between said flanges and surrounding said first member, said ring-like element having at least one circumferential rib means engaging said second resiliently deformable layer and at least one peripheral rib means engaging said first resiliently deformable layer.

6. A mount according to claim 5 wherein both said flanges have resilient layers and said ring-like element has opposed faces confronting said flanges and at least one circumferential rib on each of said opposed faces for engaging both of said resilient layers.

7. A mount according to claim 6 wherein said rib means includes a pair of ribs extending continuously about said ring-like element.

8. A mount according to claim 6 wherein said ring-like element includes a slide ring slidably engaging said circumferential rib means and said peripheral rib means for applying pressure against their respective resilient layers and permitting limited movement of said flanges in said first and second directions without causing like movement of said circumferential and peripheral rib means.

9. A mount according to claim 8 wherein said rib means engage said resilient layers with a predetermined coefficient of friction, and said rib means engage said slide ring with a different and lower coefficient of friction.

10. A mount according to claim 9 wherein said coefficients of friction differ from one another by amounts in a range of about 3:1 to about 15:1.

11. A mount according to claim 5 wherein said second member includes a tubular shell and said first member includes a bushing adapted to receive a fastener for affording connection of said first member to said first object.

12. A mount according to claim 11 wherein said first member, said second member and said resilient element are formed in sections which are connected together along a joint extending in said lateral direction to form said cavity that receives said rigid rib providing means.

13. A mount according to claim 5 wherein said first member includes a stem extending in said first direction and having means providing a pair of spaced confronting shoulders clampingly engaging said flanges therebetween.

14. A mount according to claim 13 including an auxiliary resilient block spaced from said resilient element in said first direction, and means including said stem projecting from said flanges and connected to said auxiliary block.

15. A mount for damping motion in at least two directions comprising:
a first member adapted to be connected to a first object,
a second member surrounding said first member and adapted to be connected to a second object,
a resilient elastomeric element interposed between the members and mounting the first member centrally of the second member for motion in a first axial direction relative to the second member and for motion in a second trans-axial direction lateral to said first direction,
means including said resilient element providing a first resiliently deformable elastomeric layer surrounding said first member,
means providing a pair of second resiliently deformable elastomeric layers extending outwardly from said first member and movable therewith in both said axial and trans-axial directions,
a rigid ribbed element movable with said first member and engaging both said first and said second pair of resilient layers for slidably deforming said layers in response to motion of said first member relative to said second member in either or both of said directions,
whereby relative motion between the members is damped by the interaction of the ribbed element with the elastomeric layers.

16. A mount according to claim 15 wherein said ribbed element includes a ring-like slide element surrounding said first member, a pair of circumferential rib means slidable trans-axially on axially opposite faces of said slide element, and a peripheral rib means slidable axially on the periphery of said ring-like element, and interengaging surfaces on said slide element and said rib means for permitting limited motion of said ring-like slide element without causing corresponding motion of said rib means until said surfaces interengage.

17. A mount according to claim 16 including an auxiliary elastomeric block carried by said second member and connected to said first member a spaced distance axially from said ribbed element.

18. A mount according to claim 17 wherein said means providing said pair of second layers include a pair of flanges extending in spaced relation from said first member and having said elastomeric layers bonded thereto and defining a gap therebetween, and said first member has means providing a pair of axially spaced shoulders engaging said flanges and clamping said ribbed element therebetween.

19. A mount for damping motion in at least two directions, comprising:
a first member adapted to be connected to a first object,
a second member surrounding said first member and adapted to be connected to a second object,
a resilient elastomeric element interposed between the members and mounting the first member for motion in a first axial direction centrally of the second member and for motion in a second direction trans-axial of said first direction, said elastomeric element having a cavity surrounding said first member and providing a first resiliently deformable layer extending along said first direction,
a pair of flanges carried in axially spaced relation by said first member in said cavity, each of said flanges having an elastomeric layer thereon disposed with said layers in confronting relation,
a ribbed element engaging both said first and said second pair of resilient layers for slidably deforming said layers in response to motion of said first member relative to said second member in either or both of said directions, and
means mounted on said first member for clamping said ribbed element between said pair of layers.

* * * * *